United States Patent [19]
Tsurushima et al.

[11] Patent Number: 5,506,775
[45] Date of Patent: Apr. 9, 1996

[54] POWER SOURCE CIRCUIT FOR AN OCCUPANT PROTECTING DEVICE OF MOTOR VEHICLES

[75] Inventors: Shin-ichiro Tsurushima; Satoru Matsumori; Yasuo Saito; Kazuyasu Kon; Kunihiro Kaneko; Katsushi Ohneda, all of Saitama, Japan

[73] Assignee: Kansei Corporation, Saitama, Japan

[21] Appl. No.: 63,752

[22] Filed: May 20, 1993

[51] Int. Cl.⁶ .................... B60R 21/16; B60R 21/32
[52] U.S. Cl. ............... 364/424.05; 280/735; 340/436; 340/438; 307/10.1
[58] Field of Search ............ 364/424.05; 280/735; 307/10.1; 340/436, 438; 180/274, 65.1, 65.2, 65.3, 65.8; 363/37; 320/48

[56] References Cited

U.S. PATENT DOCUMENTS

| | | | |
|---|---|---|---|
| 3,753,001 | 8/1973 | Hiroshima et al. | 307/10.1 |
| 3,916,376 | 10/1975 | Tuttle | 280/735 |
| 3,922,001 | 11/1975 | Lewis | 280/735 |
| 4,774,624 | 9/1988 | Qualich | 361/159 |
| 4,893,109 | 1/1990 | Vrabel et al. | 340/438 |
| 5,039,930 | 8/1991 | Collier et al. | 320/2 |
| 5,045,835 | 9/1991 | Masegi et al. | 340/438 |
| 5,058,920 | 10/1991 | Burger et al. | 280/735 |
| 5,093,583 | 3/1992 | Mashino et al. | 307/10.1 |
| 5,135,254 | 8/1992 | Masegi et al. | 280/735 |
| 5,155,376 | 10/1992 | Okano | 307/10.1 |
| 5,157,267 | 10/1992 | Shirata et al. | 290/38 R |
| 5,173,614 | 12/1992 | Woehrl et al. | 307/10.1 |
| 5,187,382 | 2/1993 | Kondo | 307/10.1 |
| 5,194,755 | 3/1993 | Rhee et al. | 307/10.1 |
| 5,216,284 | 6/1993 | Mattes et al. | 307/10.1 |
| 5,331,211 | 7/1994 | Kondo et al. | 307/10.1 |

Primary Examiner—Vincent N. Trans
Assistant Examiner—Tyrone V. Walker
Attorney, Agent, or Firm—Longacre & White

[57] ABSTRACT

An occupant protecting device for a motor vehicle, which inflates an air-bag system reliably to protect occupants in the event of a collision with high reliability. The occupant protecting device includes an acceleration sensor for sensing an acceleration signal of a vehicle in the event of collision with another vehicle or the like, a signal processor for detecting a collision waveform from an acceleration signal output from the acceleration sensor, a comparator for determining whether or not the output signal of the signal processor exceeds a preset level to produce a trigger signal when it exceeds the preset level, a latch circuit for latching the trigger signal from the comparator, and a firing circuit for operating an occupant protecting unit in response to a drive signal from the latch circuit.

8 Claims, 11 Drawing Sheets

POWER SOURCE CIRCUIT FOR AN OCCUPANT PROTECTING DEVICE OF MOTOR VEHICLES

BACKGROUND OF THE INVENTION

1. Field of the Invention

The present invention relates to an occupant protecting device for use in motor vehicles for protecting occupants sitting on seats of a motor vehicle in the event of a collision, and more particularly to an occupant protecting device for a motor vehicle, which inflates an air-bag system reliably to protect occupants in the event of a collision.

2. Description of the Related Art

FIG. 1 is a block diagram showing an example of a conventional occupant protecting device for use in motor vehicles.

In the figure, an acceleration sensor 1 senses an acceleration signal of a vehicle which is generated in the event of a collision with another vehicle or the like. A signal processor 2 includes an integrator for integrating the acceleration signal output from the acceleration sensor 1. The acceleration signal shows a waveform representing the collision. A comparator 3 determines whether or not the output signal of the signal processor 2 exceeds a preset level so as to produce a trigger signal when it exceeds the preset level. A one-shot multi-vibrator or drive circuit 4 latches a trigger signal from the comparator 3 for a preset period of time, and continuously produces a drive signal during the preset period. An ignition device 5 which forms a primary portion of the occupant protecting device, operates to fire in response to a drive signal from the one-shot multi-vibrator 4. When the ignition device 5 is triggered to inflate an air bag or bags and/or to strain a seat belt or belts.

In the occupant protecting device thus constructed which utilizes the integration value output from the signal processor 2, the comparator 3 judges whether or not the collision is dangerous to occupants, on the basis of the variation with time. When it is dangerous, the comparator 3 generates a trigger signal which in turn triggers the drive circuit 4 as the one-shot multi-vibrator.

Therefore, the trigger signal, the pulse width of which is not sufficiently wide, fails to trigger the one-shot multivibrator 4. The occupant protecting device may be unable to protect the occupants in such a collisional accident.

Next, a power source circuit suitable for the occupant protecting devices including an air bag, for example, thus far described will be described. In the occupant protecting device, when the power line is accidentally disconnected, a power supply is interrupted. In the accident, the energy stored in the capacitor contained in the output side of the device must be effectively used, and the power source circuit must be reliable.

FIG. 8 is a circuit diagram showing a conventional power source circuit for an igniting device of a vehicle occupant protecting device.

In FIG. 8, reference numeral 61 designates a battery; 62, an ignition switch; 63, a controller; and 64, a DC power source for air-bag inflation.

In the DC power source 64, the battery voltage which is supplied from the battery 61 through the ignition switch 62 to the controller 63, is boosted by a DC-DC converter 65 to be applied through a resistor 66 to an output capacitor 67. As a result, the output capacitor 67 is charged with the boosted voltage.

The output capacitor 67 has a large capacity since it must supply a power to a squib 80.

In the circuit, block diodes 68a and 68b are provided to block a reverse current, and a diode 69 is provided to block the rush current into the output capacitor 67.

A diagnosis circuit 70 includes a CPU. A diagnosis power source 71 receives a voltage from a car-carried battery 61, and supplies a required power to the diagnosis circuit 70.

A backup capacitor 71a is connected to the input side of the diagnosis power source 71. The backup capacitor 71a has a smaller capacity than the output capacitor 67.

A storage portion 72 transfers data to and from the diagnosis circuit 70.

Collision detecting units 74 to 79 are mounted at required parts of a car body. Each collision detecting unit includes an acceleration switch for closing in response to a predetermined change of acceleration, and a resistor. The collision detecting unit 74, for example, is made up of an acceleration switch 74a and a resistor 74b.

A squib 80, mounted on a steering portion, serves as an igniting electrode for igniting a powder to inflate an air bag (not shown) provided in the steering portion.

A spiral cable 81, which is a flexible code wound around the steering shaft, connects the squib 80 to a controller 63 electrically. The spiral cable 81 and the squib 80 constitute an operation controller 80A.

In the figure, only one squib 80 is illustrated, but if required, a plural number of squibs 80 may be provided at other seats. In this case, those squibs are electrically arranged in parallel.

Reference numerals 73a to 73n designate output terminals of the controller 63. The output terminal 73a is connected to a line L1, through the collision detecting unit 74, output terminal 73b, output terminal 73e, spiral cable 81, squib 80, and output terminal 73f.

The output terminals 73h, 73j, 731, and 73n are connected to a line L2.

The collision detecting unit 75 is connected between the output terminal 73a, 73c and 73d.

Similarly, the collision detecting units 76, 77, 78, and 79 are respectively provided between the output terminals 73g and 73h, the output terminals 73i and 73j, the output terminals 73k and 83, and the output terminals 73m and 73n.

The output terminals 73h, 73j, 731, and 73n are connected to the line L2, which is grounded.

The diagnosis circuit 70, contained in the controller 63, is grounded through a connector harness 82 and a switch SW, and also through a connector harness 83 and an alarm lamp La.

The operation of the power source circuit thus arranged will be described.

When the ignition switch 62 is closed, the voltage supplied from the battery 61 is boosted by the DC-DC converter 65. The boosted voltage is applied through the diode 68c to the output capacitor 67. The capacitor 67 is charged with a time constant which is determined by the resistor 66 and the output capacitor 67. The voltage applied to the output capacitor 67 is always higher than the battery voltage from the battery 61.

Any of the acceleration switches 74a to 79a is placed to a state resembling a short-circuited state, and a voltage across the corresponding resistor of those resistors 74b to 79b takes a normal value, the diagnosis circuit 70 determines whether the cause bringing about such a state of the switch is the failure or the collision, and stores the result of the determination into the storage portion 72.

The storage portion 72 stores information on which of the acceleration switches 74a to 79a is turned on by the collision.

In the event of a collision with another vehicle, for example, a negative acceleration is generated, as a result of which any of the acceleration switches 74a and 75b and any of the acceleration switches 76a to 79a is turned on. The charge derived from the output capacitor 67 flows through a route as indicated by a broken line. The squib 80 is heated, the powder is fired, and the air bag is inflated.

A serious collisional accident occurs, and a large impact is applied to the diagnosis circuit 70. Even under such severe conditions, the diagnosis circuit 70 must operate normally in order that it can grasp a state of the air bag system correctly.

In the conventional power source circuit arranged described above, if the ignition switch 62 is disconnected from the controller 63 by the collision, the power supply to the diagnosis circuit 70 is interrupted. As a result, the diagnosis circuit 70 will be stopped in operation.

The diagnosis circuit 70 is not stopped at the instant that the disconnection occurs since the electrical energy is supplied from the backup capacitor 71a to the diagnosis circuit 70 for a preset time period after the disconnection. In this case, the time period of supplying the energy is a short time since the capacity of the backup capacitor 71a is small. To obtain a long time continuation of the energy supply, a large capacity must be used. Further, the disconnection also stops the power supply to the DC power source 64.

Thus, in the air bag system, the energy stored in the backup capacitor 71a is used for continuing the diagnosis operation of the diagnosis circuit 70 after the disconnection, for heating the squib 80 to ignite the powder and to inflate the air bag. In this respect, it is necessary to effectively utilize the energy in the backup capacitor 71a and the output capacitor 67.

Nevertheless, no measure for effectively utilizing the stored energy under the power interrupted condition has been taken.

SUMMARY OF THE INVENTION

In view of the above, an object of the present invention is to provide an occupant protecting device for use in motor vehicles which can trigger the ignition device of the occupant protecting device in response to a trigger signal which is generated in the event of a collision.

The occupant protecting device must be reliably operated in a heavy collision to destroy the vehicle, a collision of the type in which instantaneous damage of the driver is not so large but the damage continues for a predetermined period of time, possibly leading to death of occupants (referred to as a "damage occasioning collision" or in medium speed collision.

Another object of the present invention is to provide an occupant protecting device capable of reliably operating a firing circuit in the event of the damage occasioning collision.

Still another object of the present invention is to provide a power source circuit suitable for an occupant protecting device for use in motor vehicles, which is capable of effectively utilizing a limited electrical energy stored in an output capacitor even if a power supply is interrupted by a collision.

To achieve the above object, there is provided an occupant protecting device for use in motor vehicles including an acceleration sensor for sensing variation in acceleration of a motor vehicle to detect an occurrence of a collision, a signal processor for detecting a collision waveform from an output signal of the acceleration sensor, a comparator for determining whether or not the output signal of the signal processor exceeds a preset level to produce a trigger signal, a latch circuit for latching the trigger signal from the comparator, and means for operating an occupant protecter in response to an output signal of the latch circuit.

The occupant protecting device thus arranged predicts a time ranging from an instant that a collision occurs till a driver, for example, is forced to touch a part of his body to the steering, for example, according to the acceleration waveform generated at the collision. On the basis of the prediction, the occupant protecting device actuates the operating unit reliably.

A power source circuit for a vehicle occupant protecting device according to the present invention is constituted by a DC power source for boosting a battery voltage and supplying the boosted voltage through an output capacitor to a drive circuit, and a constant voltage circuit for converting the received voltage into a predetermined voltage and for supplying the converted voltage to a signal processing circuit. The occupant protecting device includes a power feed circuit operating such that immediately after the battery voltage decreases below a preset value, the power feed circuit operates to feed electric power from the output capacitor of the DC power source to the constant voltage circuit.

The power source circuit contains a power feed circuit, which feeds electric power from the output capacitor of a DC power source to a constant voltage circuit.

The power feed circuit starts to operate immediately after the battery voltage decreases below a preset value.

With the provision of the power feed circuit, when the power supply is interrupted by the disconnection, and the battery voltage decreases to below a preset value, the energy is supplied from the output capacitor to the constant voltage circuit. As a result, the energy stored in the output capacitor can be effectively utilized.

Since the power feed circuit is operated only when necessary, the deterioration of its performance by the aging is negligible. In this respect, the power source circuit of the embodiment is reliable.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings.

DETAILED DESCRIPTION OF THE PREFERRED EMBODIMENTS

Figure 1:
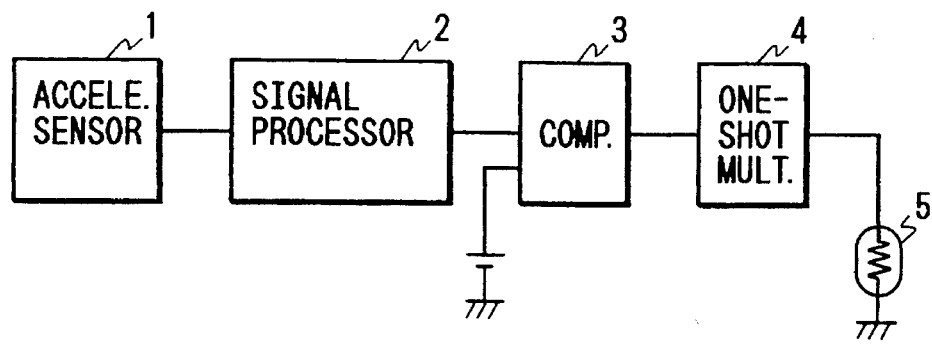
FIG. 1 is a block diagram showing a conventional occupant protecting device for use in motor vehicles.
Figure 2:
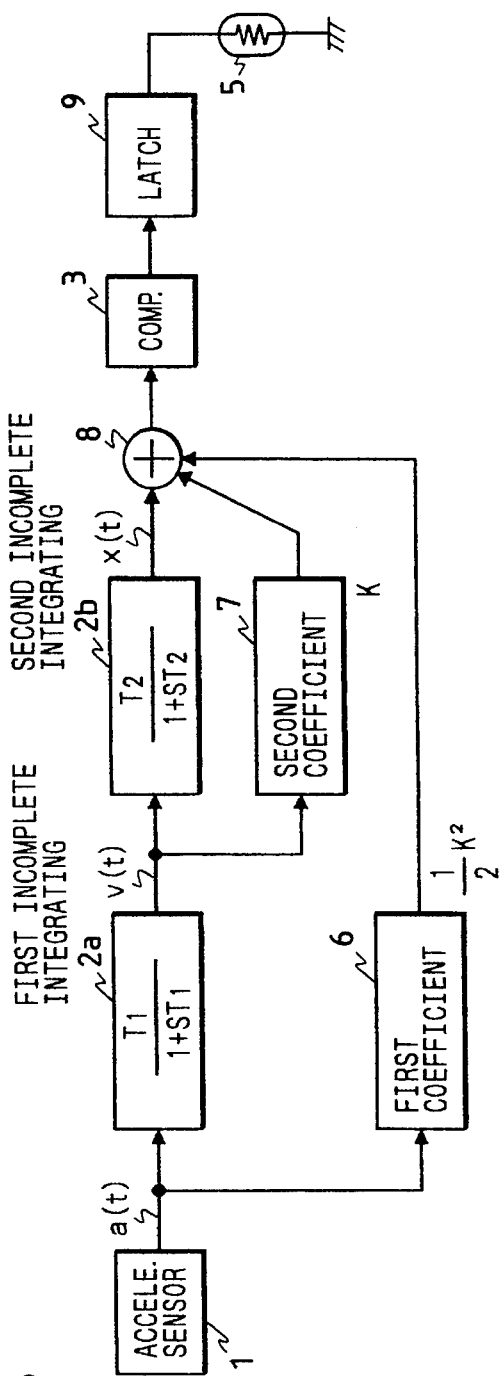
FIG. 2 is a block diagram showing a first embodiment of an occupant protecting device according to the present invention.

FIG. 2 is a block diagram showing a first embodiment of an occupant protecting device according to the present invention. In FIG. 2, the same or equivalent components as those in FIG. 1 bear the same reference numerals.

In FIG. 2, an acceleration sensor 1 senses variation in an acceleration of a motor vehicle in the event of a collision with another vehicle, for example, so as to produce an analog signal which represents a condition of the collision. A first incomplete integrating circuit 2a, having a time constant T1, receives the analog signal from the acceleration sensor 1 to be integrated therein. An second incomplete integrating circuit 2b, which has the same function as the first incomplete integrating circuit 2a, incompletely integrates again the output signal from the first incomplete integrating circuit 2a. A time constant T2 of the second incomplete integrating circuit 2b is equal to the time constant T1 of the first incomplete integrating circuit 2a. A first coefficient circuit 6, which includes a first attenuator, adds a first coefficient to the output signal of the acceleration sensor 1. A second coefficient circuit 7 includes a second attenuator having an attenuation factor of K. The second coefficient circuit 7 adds a second coefficient to the output signal of the first incomplete integrating circuit 2a. The attenuation factor of the first coefficient circuit 6 is $K^2 \times 1/2$ where K is the attenuation factor of the second coefficient circuit 7. The attenuation factor K is equal to a time $t_d$ from an instant that an igniting current is allowed to flow through an igniting device 5 till the inflation of an air bag is completed. An adder 8 adds together the output signals from second incomplete integrating circuit 2b, the first coefficient circuit 6, and the second coefficient circuit 7 to produce the addition result to the comparator 3. The first and second incomplete integrating circuits 2a and 2b, the first and second coefficient circuits 6 and 7, and the adder 8 constitute a signal processor. A latch circuit 9 latches a trigger signal output from the comparator 3. The output signal of the latch circuit 9 ignites the igniting device 5 to operate an air bag and/or a preloader, for example.

Figure 3A:
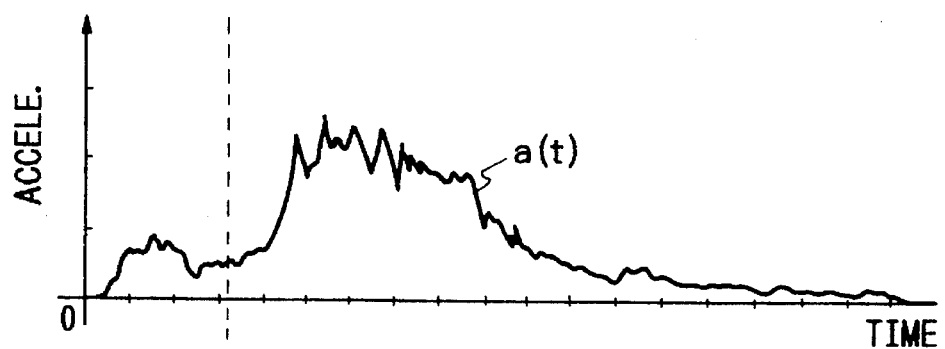
FIG. 3(A) is a waveform diagram showing variation in the output of an acceleration sensor and FIG. 3(B) is also a waveform diagram showing displacement of a driver's head.

An operation of the occupant protecting device will be described hereinafter. Various accelerations exert on a motor vehicle when it runs. It is now assumed that a vehicle running at a constant velocity Vo collides with another vehicle, for example, and an acceleration a(t) exerts on the vehicle in the forward/backward direction of the running vehicle as shown in FIG. 3(A). When the acceleration in the forward/backward direction thereof is sensed by the acceleration sensor 1, the head of a driver, for example, is forcibly moved forward with a rush, at a constant velocity Vo and the acceleration a(t) also exerts on the driver. The head moves forward at a velocity relative to the vehicle, viz., a velocity V(t) (=∫a(t)dt). The acceleration output a(t) from the acceleration sensor 1 is integrated by the first incomplete integrating circuit 2a. With the movement of the head, the head is displaced forward by x(t) (=∫V(t)dt). The displacement starts with an initial position and progresses with time. The initial position is a position of the head immediately before the collision occurs. The displacement x(t) incomplete integrating circuit 2a in the second incomplete integrating circuit 2b. A quantity of the displacement x(t) of the driver's head in real time is calculated. Then, the second coefficient circuit 7 weights the output V(t) of the first incomplete integrating circuit 2a by td, V(t) x td. That is, a quantity of the displacement for a minute duration of time td is calculated. The acceleration a(t) output from the acceleration sensor 1 is weighted by $\frac{1}{2}t^2d$ in the first coefficient circuit 6 to $\frac{1}{2}a(t) \times t_d$. That is, a quantity of the displacement for a minute duration of time td is calculated. Those outputs are added together, $x(t)+V(t) \times t_d + \frac{1}{2}a(t) \times t^2_d$.

Figure 3B:
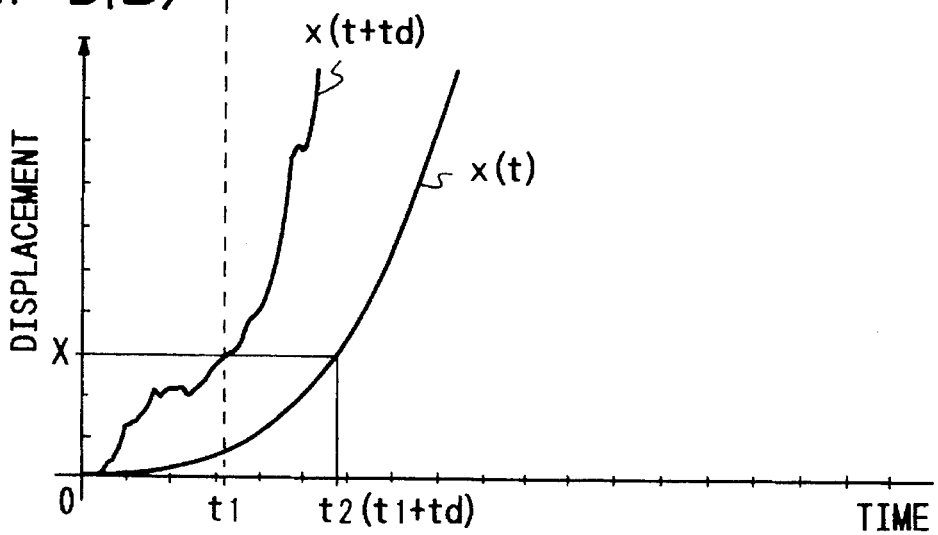

This corresponds to a predictive value $x(t+t_d)$ representing the position of the driver's head after the time td elapses from the present time point. The predictive value $x(t+t_d)$ is applied to the comparator 3. When the predictive value $x(t+t_d)$ exceeds a threshold value x at a time point where the position of the head has been displaced from the initial position "0" (see FIG. 3(B)), viz., at a time point t1, the comparator produces a trigger signal which in turn is latched in the latch circuit 9. The output signal output from the latch circuit 9 supplies an igniting current to the igniting device 5. As a consequence, the air bag is inflated thereby protecting the driver. As seen from FIG. 3(B), if the position to commence the inflation of the air bag is selected at the position located at a distance X apart from the initial position 0, the air bag starts inflating at time point t1, viz., time td earlier than time point t2 where the head actually reaches the position x.

Figure 4:
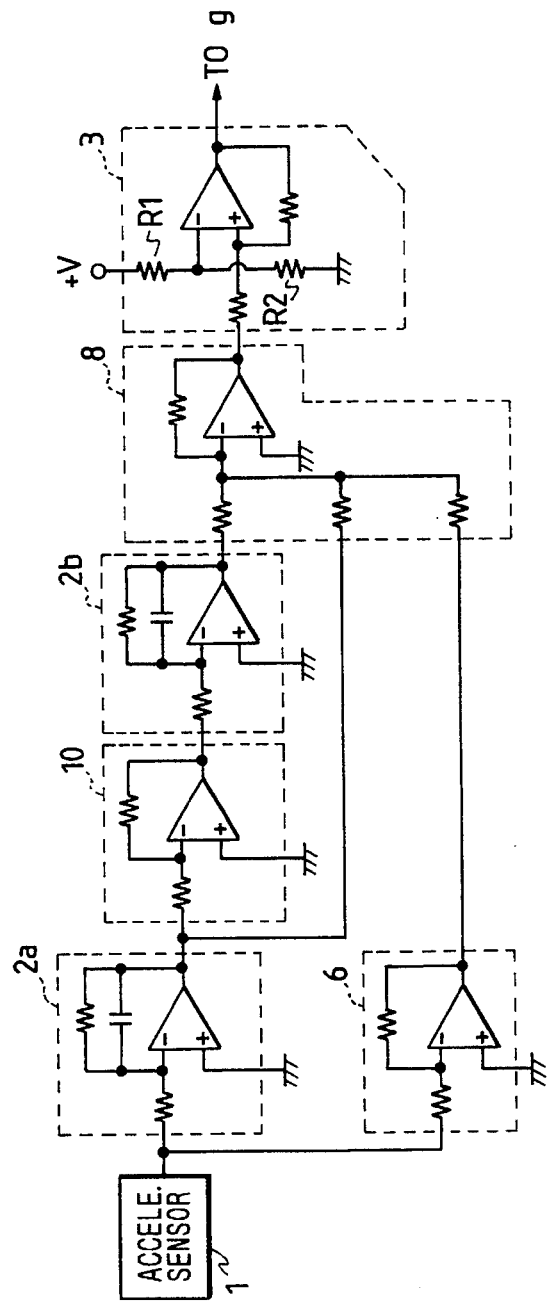
FIG. 4 is a detailed circuit diagram showing an example of the occupant protecting device according to the present invention.

FIG. 4 is a schematic diagram showing an example of a specific circuit of the occupant protecting device thus constructed and operated. In the figure, the same reference numerals designate the same or equivalent circuit components, respectively. The signal is inverted in polarity after passing the first incomplete integrating circuit 2a. Before the output signal of the first incomplete integrating circuit 2a is input to the second incomplete integrating circuit 2b, the polarity of the output signal must be inverted again. To this end, a polarity inverting circuit 10 is provided at the prestage of the second incomplete integrating circuit.

In FIG. 4, the second coefficient circuit 7 is not illustrated since the coefficient of it is set to 1.

As described above, the occupant protecting device according to the first embodiment of the invention comprises an acceleration sensor for sensing an acceleration signal of a vehicle in the event of collision with another vehicle or the like, a signal processor for detecting a collision waveform from an acceleration signal output from the acceleration sensor, a comparator for determining whether or not the output signal of the signal processor exceeds a preset level to produce a trigger signal when it exceeds the preset level, a latch circuit for latching the trigger signal from the comparator, and a firing circuit for operating an occupant protecting unit in response to a drive signal from the latch circuit.

With such an arrangement of the invention, a trigger signal generated by the comparator can reliably operate the firing circuit.

An occupant protecting device according to a second embodiment of the present invention will be described with reference to FIGS. 5 and 6.

Figure 5:
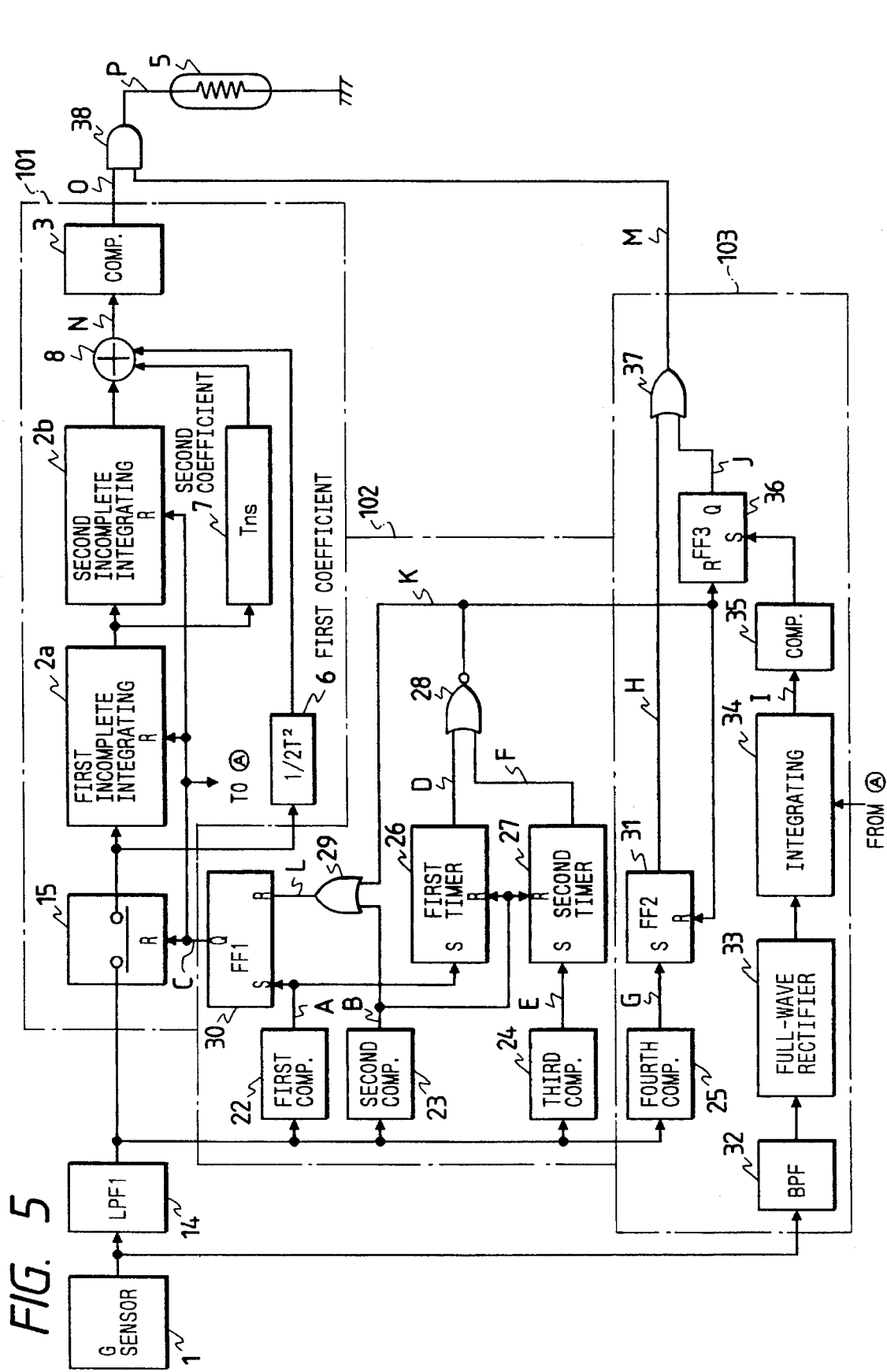
FIG. 5 is a block diagram showing a second embodiment of an occupant protecting device for use in motor vehicles according to the present invention.

FIG. 5 is a block diagram showing a second embodiment of an occupant protecting device for use in motor vehicles according to the present invention. In FIG. 5, an acceleration sensor 1 includes a piezoelectric ceramic element having a pre-amplifier, a filter, and the like. A low-pass filter (LPF) 14 of 40 Hz receives an acceleration signal output from the acceleration sensor 1. A switch 15 functions to connect and disconnect the output path of the LPF 14. A first incomplete integrating circuit 2a which integrates the output signal of the LPF 14 is an integrating circuit for velocity calculation. A second incomplete integrating circuit 2b which is coupled to the output of the integrating circuit 2a, is an integrating circuit for displacement calculation. A first coefficient circuit 6 containing a first attenuator, adds a first coefficient to the output signal of the acceleration sensor 1 which comes through the switch 15. A second coefficient circuit 7 containing a second attenuator, adds a second coefficient to the output signal of the integrating circuit 2a. An adder 8 adds together the output signals of the second integrating circuit 2b, the first coefficient circuit 6, and the second coefficient circuit 7. A comparator 3 which receives the output signal of the adder 8, produces a signal of high level when the received signal exceeds a threshold level. The switch 15, first integrating circuit 2a, second integrating circuit 2b, first coefficient circuit 6, second coefficient circuit 7, adder 8, and comparator 3 constitute a first extracter 101. The first extracter 101 functions to extract a first acceleration component which exerts on the occupants actually.

A first comparator 22 operates such that its output goes high when a first acceleration increases to exceed 1 G, for example. A second comparator 23 operates such that its output goes high when a second acceleration decreases to exceed 0.5 G, for example. A third comparator 24 operates such that its output goes high when a third acceleration increases to exceed 4 G, for example. A fourth comparator 25 operates such that its output goes high when a fourth acceleration increases to exceed 10 G, for example. A first timer 26 is actuated when the output signal of the first comparator 22 goes high and the timer 26 keeps its output in a high level state during a first timer period T1ms. A second timer 27 is actuated when the output signal of the third comparator 24 goes high, and the timer 27 keeps its output in a high level state during a second timer period T2ms. An OR gate 28 receives both output signals of the first and second timers 27 and 28. An OR gate 29 receives the output signals of the second comparator 23 and the OR gate 28. A set/reset flip-flop (FF) 30 receives at the set terminal the output signal of the first comparator 22 and at the reset terminal the output signal of the OR gate 29. The output signal of the FF 30 closes the integrator switch 15 to reset the first integrating circuit 2a for the velocity-calculation, the second integrating circuit 2b for the displacement-calculation, and other integrating circuits. The first to third comparators 22 to 24, the first and second timers 26 and 27, the OR gates 28 and 29, and the FF 30 constitute a second extracter 102 which functions to extract a second acceleration component representing an occurrence of vehicle destruction by collision only.

A set/reset flip-flop (FF) 31 operates such that when it receives the output signal from the fourth comparator 25, its output Q goes high, and when it receives the output signal from the OR gate 28, it is reset. A band-pass filter (BPF) 32 of 30 to 200 Hz, for example, receives the acceleration signal from the acceleration sensor 1. A full-wave rectifier 33 rectifies the output signal of the BPF 32. An integrating circuit 34 integrates the output signal of the full-wave rectifier 33. A comparator 35 produces a high level signal when the output signal of the integrating circuit 34 exceeds a threshold value. A set/reset flip-flop (FF) 36 is set by the high level signal from the comparator 35, and is reset by the high level signal from the OR gate 28. An OR gate 37 receives both output signals from the FFs 31 and 36. The fourth comparator 25, the FFs 31 and 36, the BPF 32, the full-wave rectifier 33, the integrating circuit 34, the comparator 35, and the OR gate 37 constitute a third extracter 103. The third extracter 103 extracts a change of the acceleration upon occurrence of dangerous collision resulting in actual damage to the occupants. An AND gate 38 produces a signal to fire the ignition device 5 when it receives both high level signals from the comparator 3 of the first extracter 101 and the OR gate 37 of the third extracter 103.

The operation of the occupant protecting device will be described. During the running of a motor vehicle, various accelerations exert on the acceleration sensor 1. When the vehicle runs at a constant speed, the output Q of the FF 30 is in low level. Accordingly, the switch 15 is in an off state, and the first and second incomplete integrating circuits 2a and 2b are both in a reset state.

Under this condition, it is assumed that a light collision resulting in no occurrence of significant damage occurs. In the light collision, as shown in FIG. 6, the G wave (denoted as (1)) varies in such a manner that it increases to reach a peak (<4 G), and then decreases toward 0 G. At a time point where the G wave (1) exceeds 1 G, the switch 15 is turned on to operate the first timer 26 for a preset period of time. Within this period, if the G wave does not exceed 10 G as indicated by a dotted line in the G wave (1), that is, if no heavy collision which will result in the occurrence of vehicle destruction, occur, the FF 30 is reset, so that the switch 15 and the first and second incomplete integrating circuits 2a and 2b are reset.

Let us consider another collision where the G wave varies as indicated by (2). As shown in FIG. 6, the G wave (2) varies in such a manner that it increases to reach a peak (<4 G) and decreases toward 0 G, and then greatly increases toward 10 G. In this collision, at a time point where the G wave (2) exceeds 1 G, the first timer 26 starts to operate. Before the time-up of the first timer 26, the second timer 27 starts to operate. Accordingly, the timer period of the first timer 26 is elongated twice as long as the equal timer period of time. During the elongated period, if no heavy collision of more than 10 G occurs as indicated by a dotted line (2) in FIG. 6, the switch 15 is turned off, so that no igniting device is fired as is similar to the light collision mentioned above.

Figure 6:
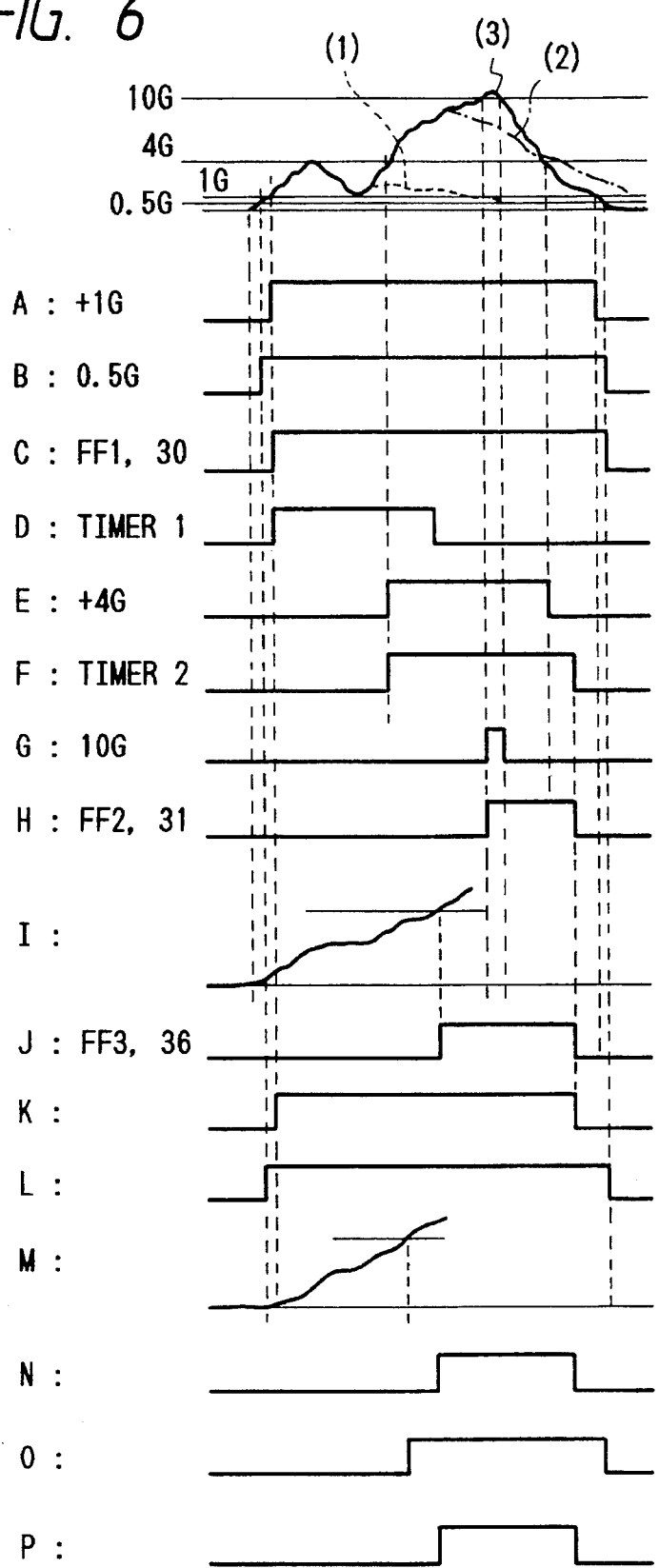
FIG. 6 is a diagram showing a variety of outputs from circuit components of the device shown in FIG. 5.

Assuming a heavy collision where the G wave varies as indicated by (3) in FIG. 6, the G wave (3) varies in a manner that it increases to reach a peak (<4 G) and decreases toward 0 G, and then greatly increases and exceeds 10 G. In this collision, within the operating time of the first timer 26 or the operating time of the second timer 27 which follows the operation of the first timer 26, both FF 31 or FF 36 is set, as a result of which the output of the FF 31 or 36 goes high (H or J in FIG. 6). The output of the OR gate 37 which receives this high level signal, goes high (M in FIG. 6). The output signal (0 in FIG. 6) from the comparator 3 of the first extracting means 101, which has been in high level, and the high level signal output from the OR gate 37 enable the AND gate 38 to produce a high level signal in turn. The high level signal output from the AND gate 38 actuates the igniting device 5 to inflate at least one of air bags, for example.

In the second embodiment of FIG. 5, the igniting device 5 is fired by either the high level signal output from the FF 31 in the third extracter 103, which is set when the serious collision occurs or the high level signal output from the FF 36 in the third extracter 103, which is set when the damage occasioning collision occurs. In this case, however, these high level signals occurs at the substantially same time, and therefore the second extracter 102 may be omitted for simplifying the circuit construction.

As described above, the occupant protecting device for use in motor vehicles of the present invention, which determines, when a collision occurs, whether or not a serious collision occurs according to an acceleration signal output from an acceleration sensor. Based on the determination, the device actuates an igniting device of the occupant protecting device. The device includes a plurality of extracters for extracting, from the acceleration signal of the acceleration sensor, a first acceleration component which exerts on occupants actually, a second acceleration component showing only the vehicle destruction, and others indicating a change of the acceleration, so that the igniting device is operated in response to the extracting result from each extracter.

With such an arrangement, when the serious collision causing vehicle destruction or the damage occasioning collision occurs, the occupant protecting device is reliably operated. In the other collisions than the above, undesired occupant protecting operation which may require replacement of the device is prevented positively accomplished.

Figure 7:
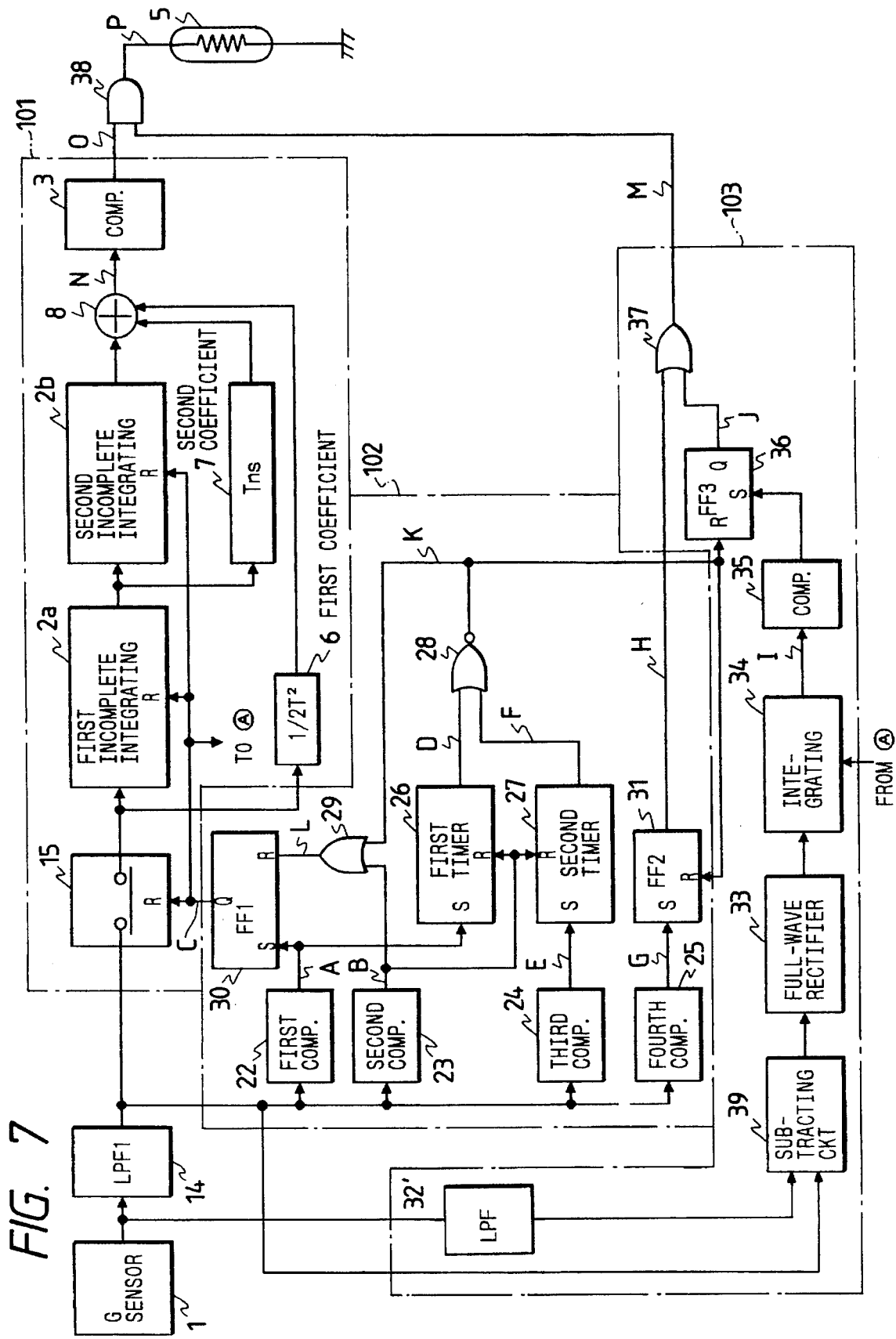
FIG. 7 is a block diagram shown in a third embodiment of the occupant protecting device according to the present invention.

A third embodiment of the occupant protecting device according to the present invention will be described with reference to FIGS. 5 and 7. In FIG. 7, the same or equivalent circuit components bear the same reference numerals in FIG. 5.

In FIG. 7, first to fourth comparators 22 to 25, first and second timers 26 and 27, OR gates 28 and 29, and FFs 30 and 31 constitute a control circuit 102 for controlling the first and second incomplete integrating circuits 2a and 2b.

A low-pass filter (LPF) 32' of 30 Hz, for example, receives an acceleration signal from the acceleration sensor 1. A subtractor 39 calculates subtraction of the outputs of the LPFs 14 and 32' to produce a limited signal having a frequency within a predetermined frequency band. A full-wave rectifier 33 rectifies the output signal of the subtractor 39. An integrating circuit 34 integrates the output signal of the full-wave rectifier 33, and is reset by the output signal of the FF 30. A comparator 35 produces a high level signal when the output signal of the integrating circuit 34 exceeds a threshold value. A set/reset flip-flop (FF) 36 is set by the high level signal from the threshold circuit 35, and is reset by the high level signal from the OR gate 28. The LPF 32', subtractor 39, full-wave rectifier 33, integrating circuit 34, comparator 35 and FF 36 constitute a medium speed detector 103. An OR gate 37 receives the output signals of the FFs 31 and 36. An AND gate 38 produces a signal to fire the igniting device 5 when it receives high level signals from the comparator 3 of the first extracter 101 and the OR gate 37 of the medium speed detector 103.

The operation of the occupant protecting device will be described. When the vehicle runs at a constant speed, an output C at the terminal Q of the FF 30 is in low level. Accordingly, the switch 15 is in an off state, and the incomplete integrating circuits 2a and 2b are both in a reset state.

Under this condition, it is assumed that a light collision occurs. In the light collision, as shown in FIG. 6, the G wave (denoted as (1)) varies in a manner that it increases to reach a peak (<4 G), and then decreases toward 0 G. At a time point where the G wave (1) exceeds 1 G, the switch 15 is turned on to operate the first timer 26 for a preset period of time. Within this period, if no heavy collision exceeding 10 G occurs, the FF 30 is reset, so that the switch 15 and the first and second incomplete integrating circuits 2a and 2b are reset.

Let us consider another collision where the G wave varies as indicated by (2) in FIG. 6. As shown in FIG. 6, the G wave (2) varies in such a manner that it increases to reach a peak (<4 G) and decreases toward 0 G, and then greatly increases toward 10 G. In this collision, at a time point where the G wave (2) exceeds 1 G, the first timer 26 starts to operate. Before the time-up of the first timer 26, the second timer 27 starts to operate. Accordingly, the timer time of the first timer 26 is elongated by the equal period of time. During the elongated period, the heavy collision of more than 10 G does not occur. Accordingly, the switch 15 is turned off, so that no firing operation to the igniting device 5 is carried out. In other words, the occupant protecting device according to the present invention may not respond to the light collision referred to above.

Let us consider a heavy collision where the G wave varies as indicated by (3). As shown, the G wave (3) varies in such a manner that it increases to reach a peak (<4 G) and decreases toward 0 G, and then greatly increases and exceeds 10 G. In this collision, within the operating time of the first timer 26 or the operating time of the second timer 27 which follows the operation of the first timer 26, the FF 31 is set. Or the FF 36 of the medium speed detector 103 is set by a medium speed collision. As a result, the output of the FF 31 or 36 goes high (H or J in FIG. 6). The output of the OR gate 37, which receives this high level signal, goes high (M in FIG. 6). The output signal (0 in FIG. 6) from the comparator 3 of the first extracter 101, which has been in high level, and the high level signal output from the OR gate 37 enable the AND gate 38, which in turn produces a high level signal. The high level signal output from the AND gate 38 operates the igniting device 5, to inflate an air bag, for example.

In the third embodiment of FIG. 7, the igniting device 5 is driven by the high level signal output from the FF 31 in the control circuit 102, which is set when the serious collision occurs or the high level signal output from the FF 36 in the medium speed collision detector 103, which is set when the medium speed collision occurs. As explained above, these high level signals occur at the substantially same time, and therefore the control circuit 102 may be omitted for simplifying the circuit construction.

As described above, the occupant protecting device in use with motor vehicles determines, when a collision occurs, whether or not a serious collision occurs according to an acceleration signal output from an acceleration sensor, and operates an occupant protecting device body proper in response to the acceleration signal. The occupant protecting device comprises a third extracter operating in the following way. The output signal of the acceleration sensor is filtered out into a signal of a frequency within a predetermined frequency band. The filtered signal, after full-wave rectified, is integrated for a preset time. When a value of the integration exceeds a preset value, the collision is determined as a medium speed collision. On the basis of the determination result, a signal is produced to operate the igniting device of the occupant protecting device. With such an arrangement, the occupant protecting device can reliably operate the occupant protecting device body proper even when a medium speed collision occurs.

Figure 8:
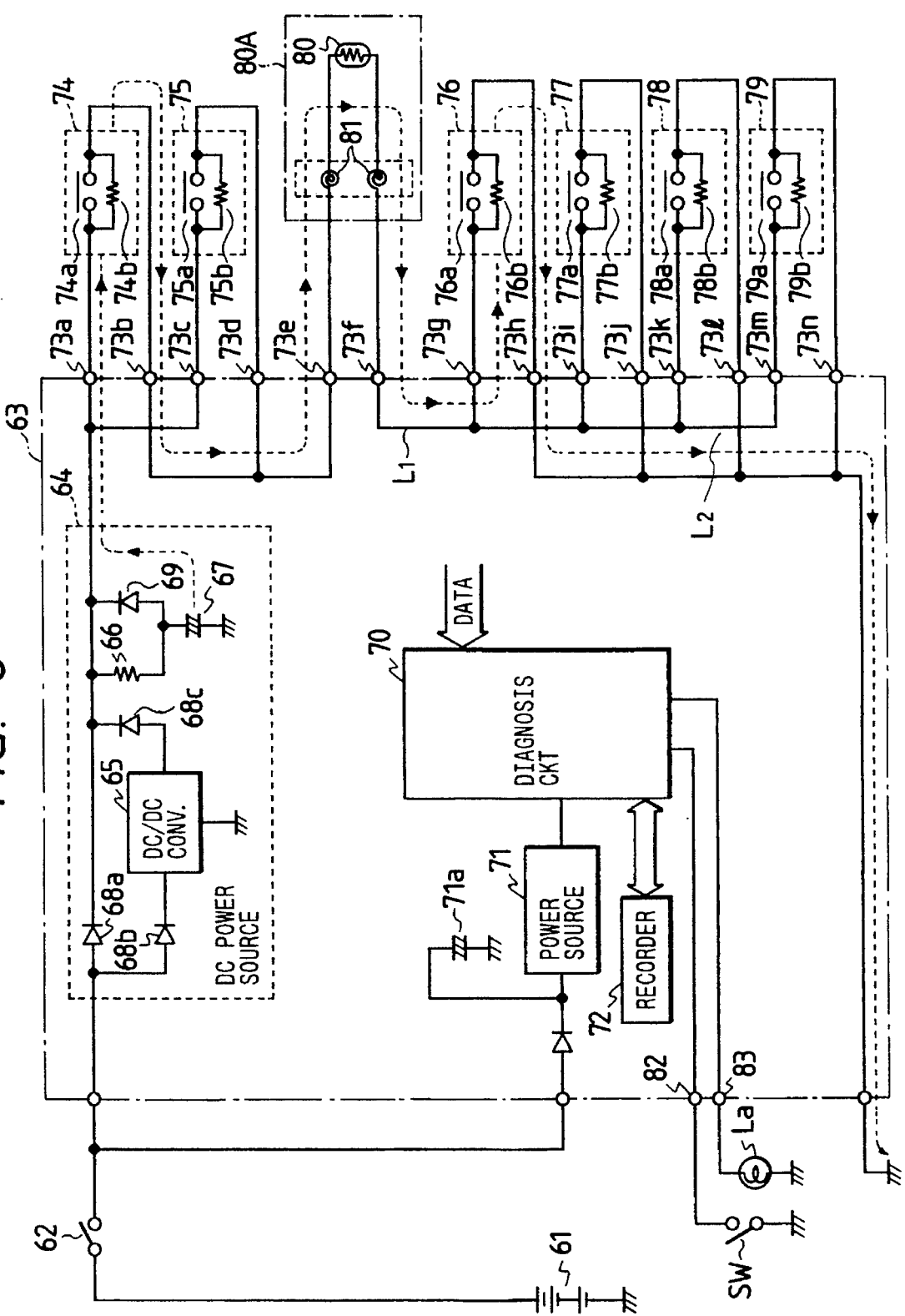
FIG. 8 is a circuit diagram showing a conventional power source circuit for an igniting device of a vehicle occupant protecting device.
Figure 9:
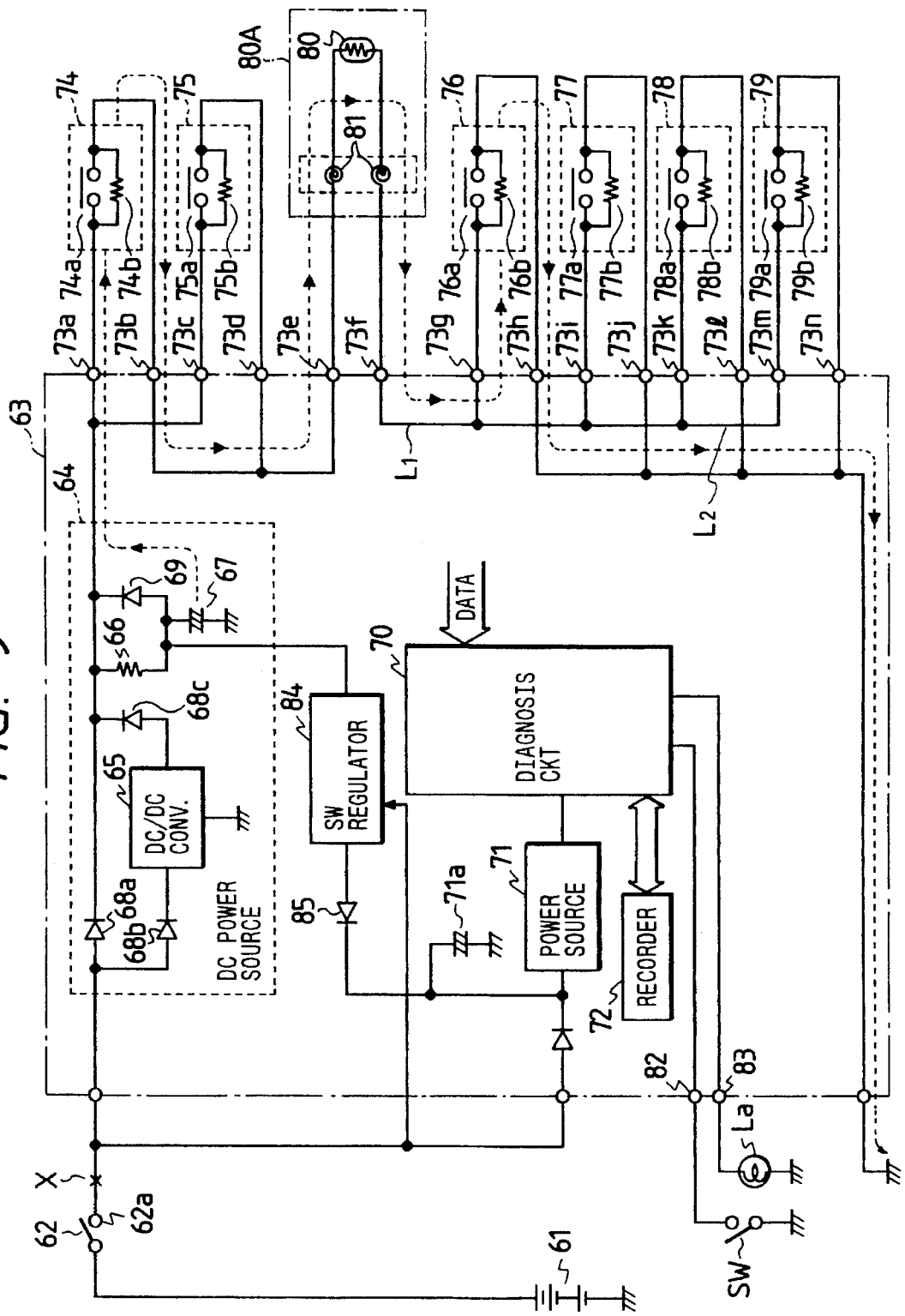
FIG. 9 is a circuit diagram showing a first embodiment of a power source circuit according to the present invention.

FIG. 9 is a circuit diagram showing a first embodiment of a power source circuit according to the present invention. The power source circuit is to be incorporated into an air bag system for motor vehicles. In FIG. 9, the same or equivalent circuit components are designated by the same reference numerals as those shown in FIG. 8.

The diagnosis circuit 70 and the storage portion 72 receive an electric power from the diagnosis power source 71. The input terminal of a switching regulator 84 is connected to the positive terminal of the output capacitor 67. The switching regulator 84 includes an on/off control terminal.

The on/off control terminal is electrically connected to the negative terminal 62a of the ignition switch 62. With this connection, a battery voltage is supplied from the battery 61 to the on/off control terminal, through the ignition switch 62.

When the battery voltage is applied to the on/off control terminal, the switching regulator 84 stops its operation.

When the voltage applied to the on/off control terminal becomes zero in value, the switching regulator 84 starts to operate and to produce a given electric power.

The output terminal of the switching regulator 84 is connected to the anode of a diode 85.

The cathode of the diode 85 is connected to the input terminal of the diagnosis power source 71.

The switching regulator 84 converts the electrical energy of the output capacitor 67 into a DC power, which in turn is supplied through the diode 85 to the diagnosis power source 71.

If a heavy collision occurs and the ignition switch 62 is disconnected from the controller 63 at a position denoted as X, the battery voltage of the car-carried battery 61 abruptly decreases to zero.

At this time, the backup capacitor 71a which is connected to the input terminal, backs up the diagnosis circuit and the storage portion 72, in the case of the conventional power source circuit as already stated.

The back-up time T1 is mathematically expressed $$T1 = -C_1 \cdot R \ln (V_3/V_1) \quad (1)$$

where $V_3$: minimum input voltage to the diagnosis power source 71;

$V_1$: voltage across the backup capacitor 71a at the start of the back-up operation;

R: combined impedance when viewing the diagnosis power source 71 from the backup capacitor 71a; and $C_1$: capacitance of the back-up capacitor.

On the other hand, in this embodiment, the switching regulator 84, which has been at standstill, starts its operation at the instant that the ignition power supply is stopped by the disconnection at the position X, to generate an electric power using the electrical energy stored in the output capacitor 67 to be supplied to the input terminal of the diagnosis power source 71.

In this embodiment, the back-up time $T_1$ when the circuits are backed up by the output capacitor 67 is mathematically expressed:

$$T_2 = -C_2 \cdot R_1 \ln (V_6/V_4) \quad (2)$$

where $V_6$: minimum input voltage to the switching regulator 84;

$C_2$: capacitance of the output capacitor 67;

$V_4$: voltage across the output capacitor 67 at the start of the back-up operation; and $R_1$: combined impedance when seeing the switching regulator 84 from the output capacitor 67.

The back-up time T for the diagnosis circuit 70 and the storage portion 72 is the sum of the back-up time $T_2$ by the output capacitor 67 and the back-up time $T_1$ by the backup capacitor 71a. Hence, the back-up time T is expressed as follows:

$$T = T_1 + T_2 = -C_1 \cdot R \ln(V_6/V_4) \quad (3)$$

The switching regulator 84 may be substituted by a so-called series regulator, such as a 3-terminal regulator.

Further, the switching regulator 84 may be omitted. In this case, the plus terminal of the output capacitor 67 is connected to the diode and to, the diagnosis power source 71.

In the case where the ignition switch 62 is disconnected from the controller 63, the battery voltage of the car-carried battery 61 abruptly decreases to zero, this embodiment operates in the following way. The switching produce an electrical power using the energy stored in the regulator 84 detects this state and starts its operation to output capacitor 67. The electrical power is supplied to the input terminal of the diagnosis power source 71.

The diagnosis power source 71 generates an electrical power using the power supplied from the switching regulator 84 and the power stored in the backup capacitor 71a, and supplies it to the diagnosis circuit 70.

The switching regulator 84 operates only when the disconnection occurs. Therefore, the deterioration of the switching regulator 84 in performance by aging is minimized, and hence the power source circuit obtained is remarkably reliable.

As described above, in the power source circuit of this embodiment, the power feed circuit operates to feed the power from the output capacitor, which is contained in the DC power source, to the constant voltage circuit, only when the disconnection occurs.

Figure 10:
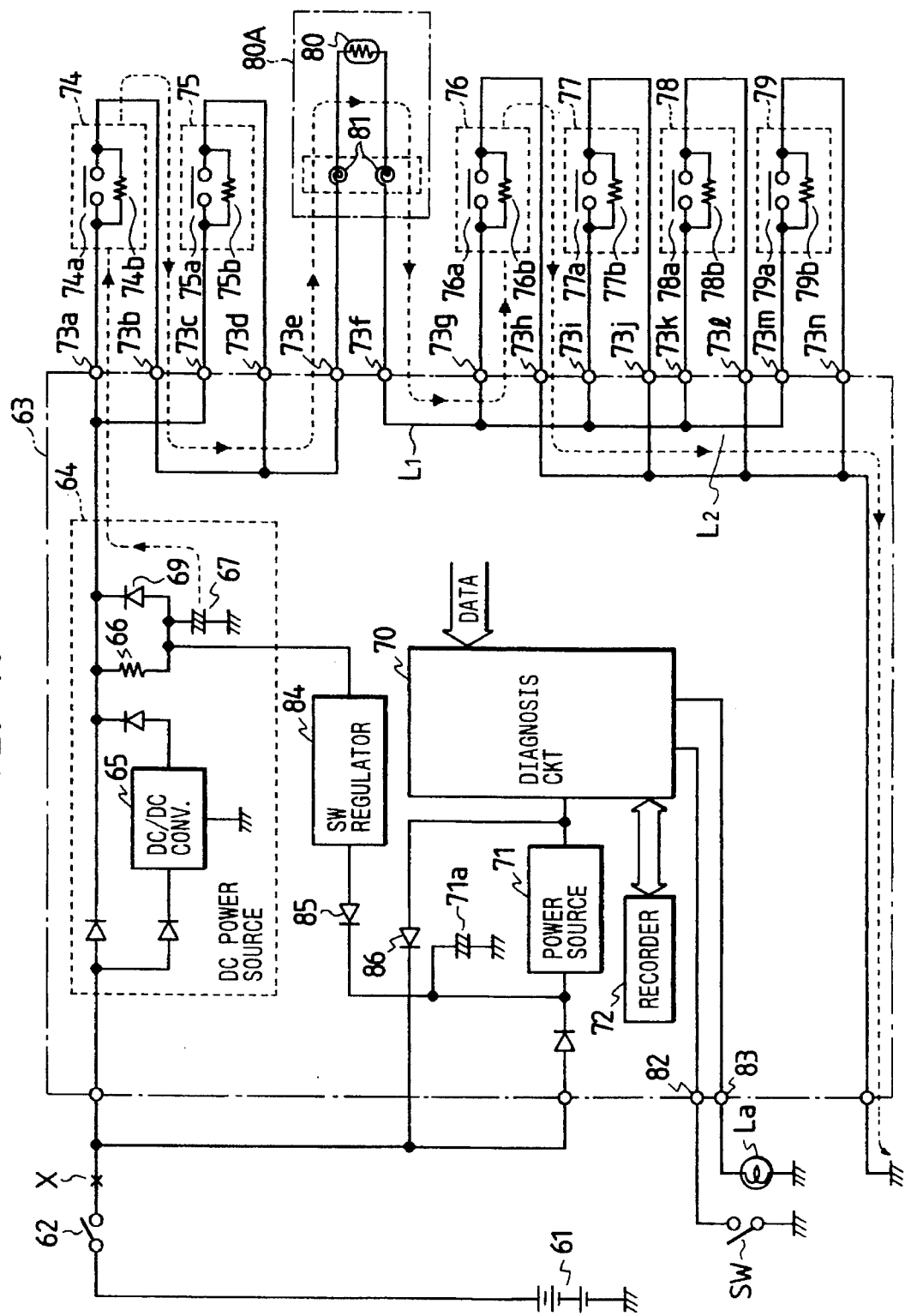
FIG. 10 is a circuit diagram showing a second embodiment of a power source circuit according to the present invention.

FIG. 10 is also a circuit diagram showing a second embodiment of a power source circuit according to the present invention. As is apparent from FIG. 10, a diode 86 is additionally provided to the circuit shown in FIG. 9. The diode 86 functions to feed back the output power of the diagnosis power source 71 to the input of the DC power source 64 for inflating the air bag.

The anode of the diode 42 is connected to the output terminal of the diagnosis power source 71 whereas the cathode of the diode 42 is connected to the DC power source 64.

With provision of the diode, when the disconnection occurs, part of the limited electrical energy stored in the capacitor of the diagnosis power source 71 is returned through the diode 42 to the DC power source 64, which then supplies the received power to the combinations of acceleration switches and resistors 74a and 74b to 79a and 79b, and to the igniting or firing controller 80A.

Since the power source circuit is thus arranged, it can reliably operate the air bag system when the electric power drops by the disconnection when the collision occurs.

In the power source circuit of the second embodiment, when the disconnection trouble takes place, the output capacitor in the DC power source feeds the power to the constant voltage circuit. At the same time, part of the output voltage of the constant voltage circuit is fed back to the input of the DC power source. Therefore, the effective utilization of the electrical energy stored in the output capacitor is realized.

In the power source circuit of FIG. 9 or 10, the voltage of the battery 61 is boosted by the DC-DC converter 65, to gain a stabilized high voltage. The high voltage is stored in the auxiliary power source, or output capacitor 67. Utilizing the stored high voltage, the power is supplied to the squib 80, to fire a powder to inflate the air bag. Because of the construction of the power source circuit, when the voltage of the auxiliary power source is lower than a predetermined voltage or it varies, it fails to operate the air bag system.

To avoid this, the DC-DC converter 65 which boosts the battery voltage to generate a high voltage and then supplies the power to the auxiliary power source, must reliable and hence is expensive.

To solve the above problem, an igniting circuit in which an ordinary boost circuit simple in construction and low to boost the battery voltage to generate a high voltage and to supply the power to the auxiliary power source.

To be more specific, the igniting circuit uses an inexpensive and simple boosting circuit instead of the expensive DC-DC converter 65 including a first converter for converting the output power of a DC power source into an AC power, a second converter for converting the AC power from the first converter into a DC power and a third converter for converting the DC voltage from the second converter into a voltage several times as large as the received DC voltage.

The igniting circuit further includes signal time-width varying unit for varying the output time width of a signal for driving the occupant protecting device according to the voltage value of the auxiliary power source.

With such an arrangement, when the output voltage of the boosting circuit varies and the voltage value of the auxiliary power source varies, the output time width of the signal for driving the igniting circuit varies according to the varying voltage value.

The igniting circuit, although it is simple and inexpensive, is able to supply the electric power enough to drive the occupant protecting device.

Figure 11:
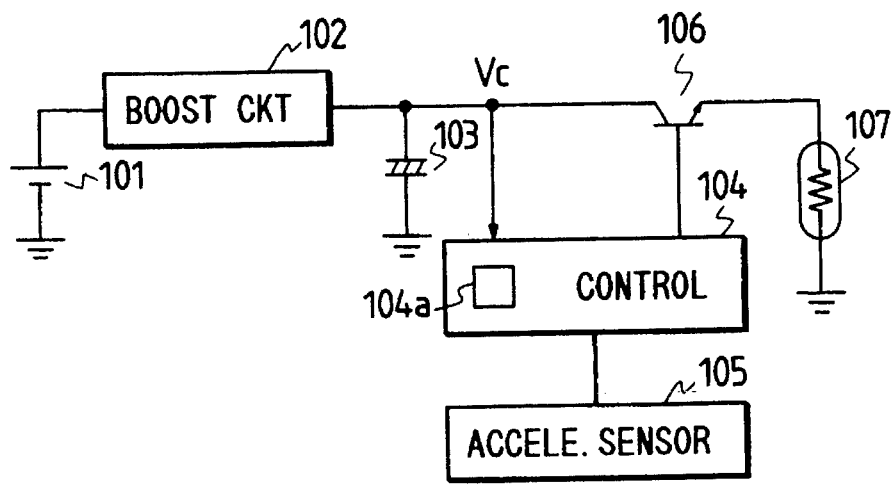
FIG. 11 is a block diagram showing an igniting circuit for use in an occupant protecting device according to the present invention.

FIG. 11 is a block diagram showing an igniting circuit for use in an occupant protecting device according to the present invention. In FIG. 11, a car-carried battery 101 is a main power source in the occupant protecting device for a motor vehicle. A boost circuit 102 boosts the voltage of the battery 101. The boost circuit 102 which forms the above described first to third converters, is constituted by a voltage multiplying rectifier circuit including a transistor bridge, capacitors and diodes. The boost circuit converts a DC power to an AC power. An auxiliary power source 103 is an auxiliary power source having a capacitor, which supplies an igniting power to an igniting device 107 to be given later when a collision accident occurs.

A control circuit 104 determines whether or not the ignition power is supplied to the ignition device 107 on the basis of the output signal from an acceleration sensor 105, and applies a pulsasive control signal S to a transistor 106.

The control circuit 104 includes a pulse-width varying circuit 104a.

The pulse-width varying circuit 104a detects the output voltage of the auxiliary power source 103 and varies the pulse width of the control signal S according to the detected voltage. In response to the control signal S of the control circuit 104, the transistor 106 is operated to supply the power from the auxiliary power source 103 to the ignition device 107.

The ignition device 107 operates in response to the control signal S from the control circuit 104 to inflate the air bag, mounted on the steering, for example.

When a motor vehicle runs normally, the output voltage of the battery 101 is boosted by the boost circuit 102 to be supplied to the auxiliary power source 103.

The boost circuit 102 boosts the battery voltage integer times and supplies it to the auxiliary power source 103. The boosted voltage is still instable.

Accordingly, the output voltage of the auxiliary power source 103 depends on the output voltage of the battery 101. When the battery 101 is discharged and its output decreases, the output voltage Vc of the auxiliary power source 103 also decreases.

The pulse-width varying circuit 104a of the control circuit 104 monitors the output voltage vc of the auxiliary power source 103.

When the vehicle collides with another vehicle, for example, the control circuit 104 produces a control signal S to the transistor 106 on the basis of the voltage from the acceleration sensor 105.

The transistor 106 is turned on, so that the supply of an ignition power from the auxiliary power source 103 to the ignition device 107 starts.

The pulse-width varying circuit 104a determines the time necessary for supplying the power to drive the igniting device 107 using the output voltage Vc of the auxiliary power source 103, and stops the supply of the control signal S when the power to drive the igniting device 107 has been supplied.

Accordingly, the transistor 106 is turned off, to stop the power supply from the auxiliary power source to the ignition device 107.

Figure 12A:
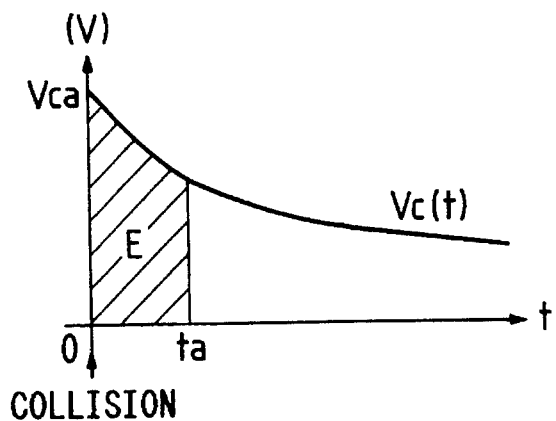
FIGS. 12(a) and 12(c) show waveforms of the output voltage of an auxiliary power source.
Figure 12B:
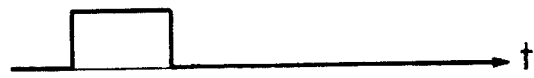
FIGS. 12(b) and 12(d) show waveforms of a control signal S corresponding to a power supply time.

The method to determine the power supply time will be described using two cases; a first case where the output voltage of the auxiliary power source 103 at the start of the collision is Vca in FIG. 12(a), and a second case where the output voltage is Vcb where Vca>Vcb as shown in FIG. 12(b).

The electric energy E necessary for firing the igniting device 107 is previously calculated in connection with the igniting device 107.

Figure 12C:
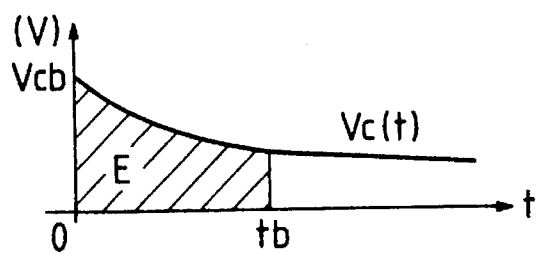

The output voltage Vc(t) of the auxiliary power source 103 varies as shown in FIGS. 12(a) and 12(c), depending on the initial value at the start of the power supply to the igniting device 107, the capacitance of the auxiliary power source 103, and the load including the igniting device 107. The output voltage Vc(t) is sampled every preset period of time, starting from a time point where the control signal S is output. The sampled values are accumulatively calculated. A time taken for the calculated value to reach a value corresponding to the electric energy E (indicated by the shaded areas in the graphs) is the power supply time.

At the time point where the control signal S is output, the output voltage Vc of the auxiliary power source 103 shown in FIG. 12(a) is equal to the output voltage Vc in the case of FIG. 12(c). Accordingly, the power supply time ta in the case of FIG. 12(a) is smaller than that tb of FIG. 12(b).

Figure 12D:

FIGS. 12(b) and 12(d) show waveforms of the control signal S corresponding to the power supply time.

In the embodiment as mentioned above, the output voltage Vc(t) is sampled every preset period of time, and the sampled values are accumulatively calculated. A time taken for the calculated value to reach a value corresponding to the electric energy E is used as the power supply time. The embodiment may be modified as follows. The output voltage Vc(t) of the auxiliary power source 103 is integrated by integrator. When the output value of the integrator reaches the value corresponding to the electric energy E, the supply of the control signal S is stopped.

In another modification, a microcomputer is used. In this case, the output voltage Vc(t) of the auxiliary power source 103 is digitized every preset period by an A/D converter. The digital signals obtained are accumulated. When the accumulated value reaches the value corresponding to the electric energy E, the supply of the control signal S is stopped.

The discharge characteristic of the auxiliary power source 103 depends on the initial value at the start of the power supply to the igniting device 107, the capacitance of the auxiliary power source 103, and the load including the igniting device 107.

In this case, the capacitance of the auxiliary power source 103, and the load including the igniting device 107 are constant. The power supply time satisfying the electric energy E necessary for driving the igniting device 107 is previously calculated for the initial voltage value of the auxiliary power source 103. A time table for defining the power supply time vs. the initial voltage time of the auxiliary power source 103 is prepared and stored into a memory.

The microcomputer or CPU fetches digital signals representing the output voltage Vc(t) of the auxiliary power source 103, from the A/D converter at the start of the power supply to the igniting device 107. It refers to the data table using the fetched output voltage (initial voltage value) of the auxiliary power source 103, and reads the corresponding power supply time from the data table. On the basis of the readout data, the CPU sets the power supply time and turns off the control signal S at a time point where the power supply time terminates. In this way, the power supply to the ignition device 107 is controlled.

As described above, the output time width of the signal for driving the occupant protecting device is varied in accordance with the voltage value of the auxiliary power source. Accordingly, a simple and inexpensive boost circuit may be acceptable. Further, even if the output voltage of the auxiliary power source is instable, the ignition device can be reliably driven.

Figure 13:
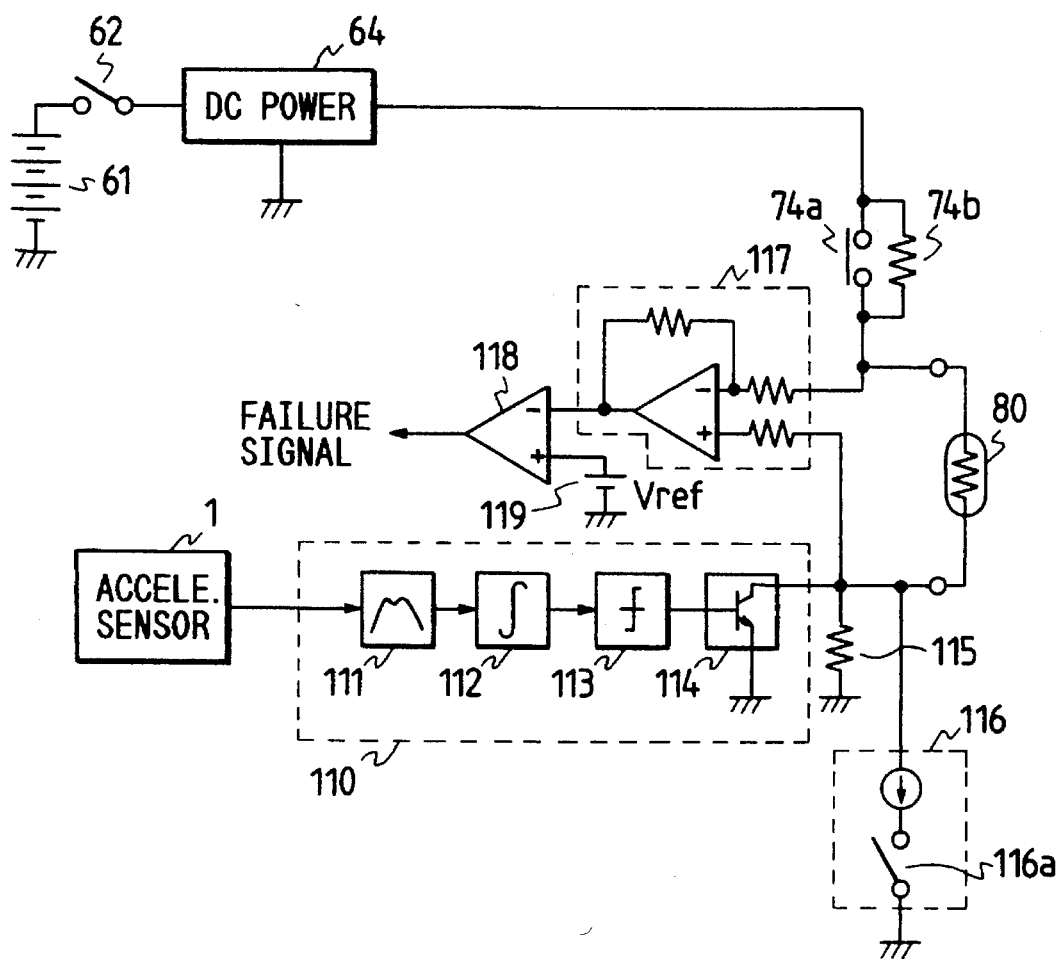
FIG. 13 is a circuit diagram showing an example of a diagnosis circuit for an occupant protecting device.
Figure 14:
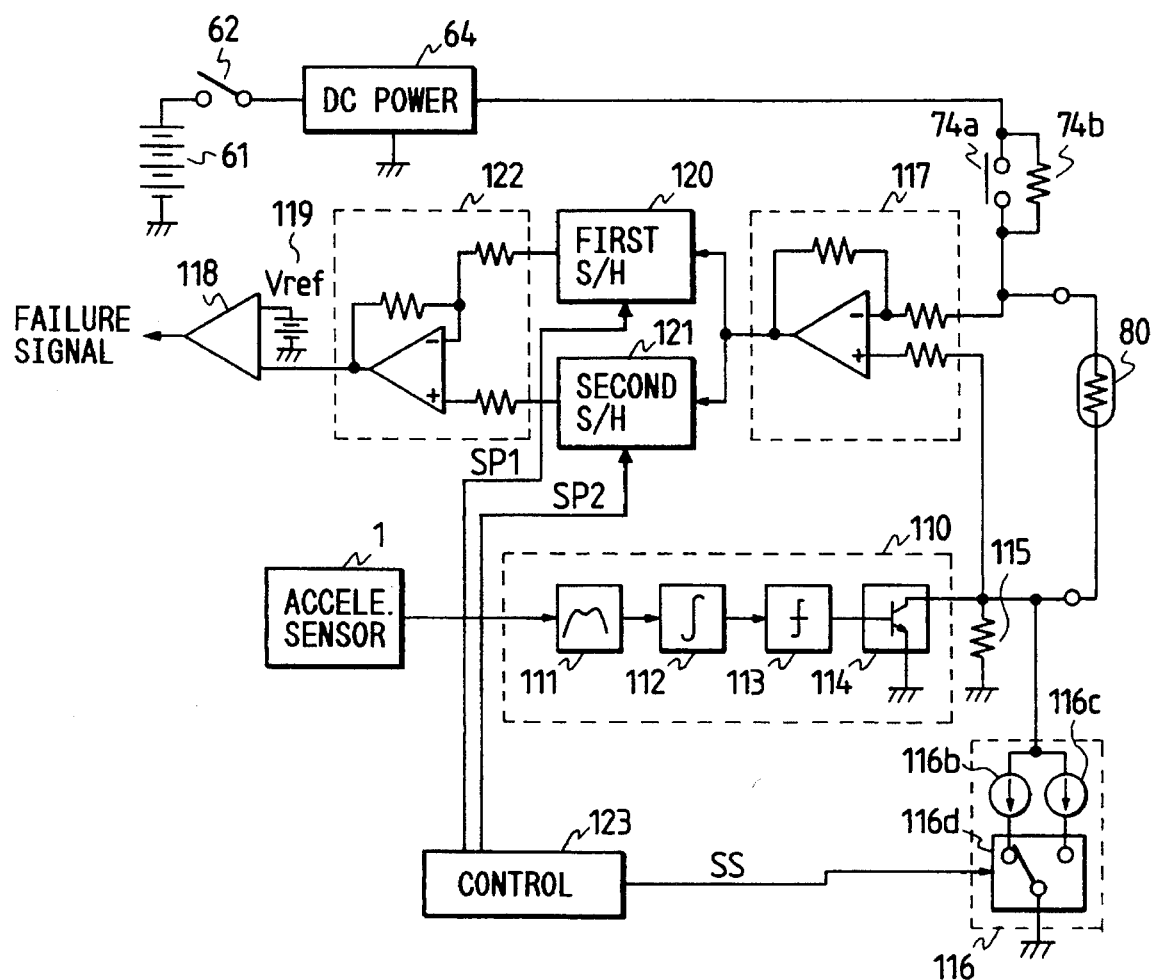
FIG. 14 is a circuit diagram showing an embodiment of a diagnosis circuit for an occupant protecting device according to the present invention.

FIG. 13 is a circuit diagram showing an example of a diagnosis circuit for an occupant protecting device. The diagnosis circuit determines whether the igniting circuit is normal or abnormal by feeding a minute current into the igniting circuit.

In FIG. 13, reference numeral 61 designates a car-carried battery; 62, an ignition switch; and 64, a DC power source 64 for ignition, which is provided with a boosting DC-DC converter.

A high-pass filter 111, an integrator 112, a comparator 113 and an amplifier 114 constitute an operation determining circuit 110 in the diagnosis circuit. The operation determining circuit 110 receives an output from the acceleration sensor A voltage dividing resistor 115 for diagnosis, an acceleration switch 74a and a resistor 74b coupled in parallel to the switch 74a, and an squib 80 for firing the powder to inflate the air bag are further provided as shown in FIG. 13.

A constant current circuit 116 operates to allow a constant current of 100 mA to flow thorough the squib 80. A switch circuit 116a is provided to actuate the constant current circuit 116. A differential amplifier 117 is connected in such a manner that the inverting input terminal thereof is connected through a resistor to the power source terminal of the ignition circuit or squib 80, and the non-inverting input terminal is connected through a resistor to the ground terminal of the squib 80.

The differential amplifier 117 detects a voltage appearing across the terminals of the squib 80 and amplifies the detected voltage to be supplied to the following comparator 118. The comparator 118 has a non-inverting input terminal connected to the plus terminal of a reference voltage source 119 for producing a reference voltage Vref. The inverting input terminal of the comparator 118 is connected to the output terminal of the differential amplifier 117.

In the diagnosis circuit for the occupant protecting device, a relatively large current of 100 mA for instance is fed to the squib 80 in order that an offset of the signal output from the differential amplifier 117 is set small, and that the differential amplifier 117 can produce a signal large enough to discriminate a normal state of the squib 80 from a failure state of disconnection or just-before disconnection.

The operation of the diagnosis circuit thus arranged will be described.

When an impact acceleration exerts on a vehicle body in the event of a collision, the acceleration sensor 1 and the acceleration switch 74a cooperate to detect variation in such an acceleration.

As a result, the acceleration switch 74a is turned on and an electrical signal representing the acceleration output from the acceleration sensor 1 is applied to the operation determining circuit 110.

The signal is applied to the base terminal of the output transistor of the amplifier 114, through the high-pass filter 111, integrator 112 and comparator 113, so that the output transistor of the amplifier 114 is turned on to thereby cause a DC power source 64 to supply a current large enough to actuate the squib 80.

Consequently, the squib 80 fires the powder to inflate the air bag.

When no acceleration is applied to the vehicle body, the acceleration switch 74a and the output transistor of the amplifier 114 are in an off state.

To diagnose the squib-80, the switch circuit 116a is closed. Then, a constant current of 100 mA is allowed to be fed from the DC power source 64 to the squib 80 for the purpose of diagnosis operation. It should be noted that the constant current of 100 mA is not so large to actuate the squib 80. When the constant current flows through the squib 80, a potential difference appears across the squib 80 depending on a condition of the squib 80 such as normal state, a state of disconnection or a state of just-before disconnection.

The differential amplifier 117 amplifies this potential difference to be applied to the comparator 118 where the signal output from the differential amplifier 117 is compared with the reference voltage Vref of the reference voltage source 119. When the former exceeds the latter, the differential amplifier 117 produces a failure signal indicative of a failure of the squib 80.

When there occurs poor connection or disconnection in the squib 80, the potential difference across the squib 80 is larger than that when the squib 80 is in a normal state. In this case, the potential difference may increase up to the power source voltage. As a result, the output signal of the comparator 118 is larger, the signal applied to the inverting input terminal of the comparator 118 exceeds the reference voltage Vref, so that the comparator 118 produces a failure signal.

In the diagnosis circuit of FIG. 13, the current fed to the squib 80 for diagnosing the squib 80 is a constant current of 100 mA, which cannot actuate the squib 80. However, this current is not so small relative to the operating current of the squib 80, and thus If the constant current accidentally and instantaneously increases, it may be likely to actuate the squib 80 erroneously.

To solve this problem, modification is possible with using a minute current thereby improving the reliability of the diagnosis circuit. Shown in FIG. 18 is an embodiment of the modification where a minute current is fed to the squib for diagnosing operation.

In FIG. 18 which is a circuit diagram showing the embodiment of the invention, the same or equivalent circuit components are designated by the same reference numerals as those in FIG. 17.

A constant current circuit unit 116 which is constituted by first and second constant current sources 116b and 116c and a switch circuit 116d, is inserted between the squib 80 and ground.

The first constant current 116b is able to feed a constant current of 100 mA. The second constant current 116c is able to feed a constant current of 20 mA.

In response to a switch signal SS which is produced by a control circuit 123, the switch circuit 116d is turned to either one of the first constant current source 116b or the second constant current 116c to supply the current of 10 mA or 100 mA for diagnosis to the squib 80 alternatively.

A differential amplifier 117 detects a potential difference across the squib 80 when it is fed with 10 mA or 100 mA.

A first sample/hold circuit 120 samples and holds the output signal of the differential amplifier 117 in response to a sample pulse signal SP1 from the control circuit 123. A second sample/hold circuit 121 samples and holds the output signal of the differential amplifier 117 in response to a sample pulse signal SP2 therefrom.

The control circuit 123 produces the switch signal SS to be applied to the switch circuit 116d, the sample pulse signal SP1 to be applied to the first sample/hold circuit 120, and the sample pulse signal SP2 to be applied to the second sample/ hold circuit 121. The control circuit 123 outputs the sample pulse signal SP1 in synchronism with the time period that the switch circuit 116d is turned to the first constant current 116b by the switch signal SS. The control circuit 123 outputs the sample pulse signal SP2 in synchronism with the time period that the switch circuit 116d is turned to the second constant current 116c by the switch signal SS.

A second differential circuit 122 detects a difference between the output signals of the differential amplifier 117 which are sampled and held by the first and second sample/ hold circuits 120 and 121, to produce an amplified output signal indicative of the difference.

The comparator 118 receives at the inverting input terminal the amplified output signal of the second differential circuit 122. On the other hand, the same receives at the non-inverting input terminal the reference voltage Vref from the reference voltage source 119.

The operation of the diagnosis circuit for an occupant protecting device will be described.

To diagnose the occupant protecting device, the control circuit 123 sends the switch signal SS, and sample pulse signals SP1 and SP2 to the switch circuit 116d, the first sample/hold circuit 120, and the second sample/hold circuit 121.

In response to the switch signal SS, the switch circuit 116d is turned, at fixed periods, to the first constant current source 116b or the second constant current source 116c, so that either a constant current of 10 mA or 20 mA is allowed to flow through the squib 80. A voltage appears across the squib 80, which depends on the current flowing through the squib 80.

The differential amplifier 117 detects this voltage and applies the detected voltage to both the first sample/hold circuit 120 and the second sample/hold circuit 121.

The first sample/hold circuit 120 samples and holds the output signal of the differential amplifier 117 when the switch circuit 116d is turned to the first constant current source 116b. On the other hand, when the switch circuit 116d is turned to the second constant current source 116c, the second sample/hold circuit 121 samples and holds the output signal of the differential amplifier 117.

The output signal of the differential amplifier 117, which has been sampled and held by the first sample/hold circuit 120, represents the voltage appearing across the squib 80 when the minute current of 10 mA is allowed to flow through the squib 80. On the other hand, the output signal of the differential amplifier 117, which has been sampled and held by the second sample/hold circuit 121, represents the voltage appearing across the squib 80 when the minute current of 20 mA is allowed to flow therethrough. Accordingly, a difference between these voltages across the squib are twice as much as the voltage appearing across the squib when a single constant current source is employed to cause a constant current to flow through the squib.

For this reason, the amplification factor of the differential amplifier 117 may be correspondingly reduced, so that the offset contained in the output signal of the amplifier is made smaller. Further, due to the using of the above described difference between the two output signals of the differential amplifier 117, the offsets-contained in those output signals are canceled accordingly resulting in improving the reliability of the occupant protecting device.

When the squib 80 is normal, the constant current of 10 mA or 20 mA flowing through the squib 80 causes a constant voltage drop across the squib 80. The comparator 118 determines whether the squib 80 is normal or abnormal on the basis of the constant voltage drop across the squib 80.

When a disconnection occurs in the squib 80, the difference between the output signals of the differential amplifier 117 which are sampled an held by the first sample/hold circuit 120 and the second sample/hold circuit 121, respectively becomes zero. When receiving this signal, the comparator 118 decides that the squib 80 is abnormal.

In this embodiment, a minute constant current of 10 mA or 20 mA is fed to the squib 80 to cause different voltage drops across the squib 80. The detected voltage drops across the squib are sampled and held by the sample/hold circuits in synchronism with the supply of the different minute currents to the squib. These different voltage drops are used for the diagnosis. Since the current fed to the squib 80 is small, there is no possibility of actuating the squib 80 erroneously.

What is claimed is:

1. A power source circuit for an occupant protecting device of motor vehicles comprising:

a DC converter means for boosting a battery voltage subsequently delivered to charge an output capacitor, the charge accumulated in said output capacitor being supplied to a drive circuit for an occupant protecting device;

a diagnostic voltage source for converting the battery voltage into a predetermined voltage to be supplied to a signal processing circuit for determining a condition of said occupant protecting device;

a switch regulator means for delivering the charge accumulated in said output capacitor to said diagnostic voltage source immediately after the battery voltage is reduced less than a predetermined level, wherein said switch regulator means comprises a control means for monitoring said battery voltage and for determining when said battery voltage is reduced less than said predetermined level, and wherein said switch regulator means remains in a non-operative condition as long as the battery voltage is applied to said control means, but operates to deliver said charge accumulated in said output capacitor to diagnostic voltage source when said battery voltage is reduced less than said predetermined level; and a reverse-current preventing diode electrically connected between said switch regulator means and said diagnostic voltage source to prevent current flow in a direction from said diagnostic voltage source toward said switch regulator means.

2. The power source circuit as defined in claim 1 further comprising a feedback circuit for feeding the output voltage of said voltage source back to the input of said DC power source.

3. The power source circuit as defined in claim 1 wherein said DC power source comprises a voltage multiplying rectifier circuit including a transistor bridge, capacitors and diodes, and wherein the pulse width of a signal for driving the occupant protecting device is varied according to the output voltage value of said output capacitor.

4. The power source circuit as defined in claim 1, wherein said switch regulator means converts said charge accumulated in said output capacitor into a DC power, which in turn is supplied to said diagnosis voltage source.

5. The power source circuit as defined in claim 1, further comprising a backup capacitor for supplying a backup voltage to an input of said diagnosis voltage source.

6. A power source circuit for an occupant protecting device of motor vehicles comprising:

A battery voltage means for supplying a battery voltage;

a DC converter means for receiving and boosting said battery voltage to charge an output capacitor, the charge accumulated in said output capacitor being supplied to a drive circuit for an occupant protecting device;

a diagnostic voltage source for receiving said battery voltage and for converting said battery voltage into a predetermined voltage to be supplied to a signal processing circuit for determining a condition of said occupant protecting device;

a switch regulator means for providing an electrical connection between said output capacitor and said diagnosis voltage source and comprising a control terminal means for monitoring said battery voltage, wherein said switch regulator means supplies at least a portion of the charge accumulated in said output capacitor to said diagnosis voltage source when said control terminal means determines that the battery voltage is below a predetermined level; and a reverse-current preventing diode electrically connected between said switch regulator means and said diagnostic voltage source to prevent current flow in a direction from said diagnostic voltage source toward said switch regulator means.

7. A power source circuit for an occupant protecting device of motor vehicles comprising:

a DC converter means for boosting a battery voltage subsequently delivered to charge an output capacitor, the charge accumulated in said output capacitor being supplied to a drive circuit for an occupant protecting device;

a diagnostic voltage source for converting the battery voltage into a predetermined voltage to be supplied to a signal processing circuit for determining a condition of said occupant protecting device;

a back-up capacitor electrically connected to said diagnostic voltage source for supplying electrical energy to said diagnostic voltage source; and a switch regulator means for delivering the charge accumulated in said output capacitor to said diagnostic voltage source immediately after the battery voltage is reduced less than a predetermined level, wherein said switch regulator means comprises a control means for monitoring said battery voltage and for determining when said battery voltage is reduced less than said predetermined level, and wherein said switch regulator means remains in a non-operative condition as long as the battery voltage is applied to said control means, but operates to deliver said charge accumulated in said output capacitor to diagnostic voltage source when said battery voltage is reduced less than said predetermined level.

8. The power source circuit according the claim 7, further comprising a reverse-current preventing diode electrically connected between said switch regulator means and said diagnostic voltage source to prevent current flow in a direction from said diagnostic voltage source toward said switch regulator means.

* * * * *